June 15, 1965 P. P. HAHN 3,189,017
FUEL BURNING AIR HEATING APPARATUS
Filed Feb. 28, 1962 4 Sheets-Sheet 1

INVENTOR:
PATRICK P. HAHN
BY
Howson & Howson
ATTYS.

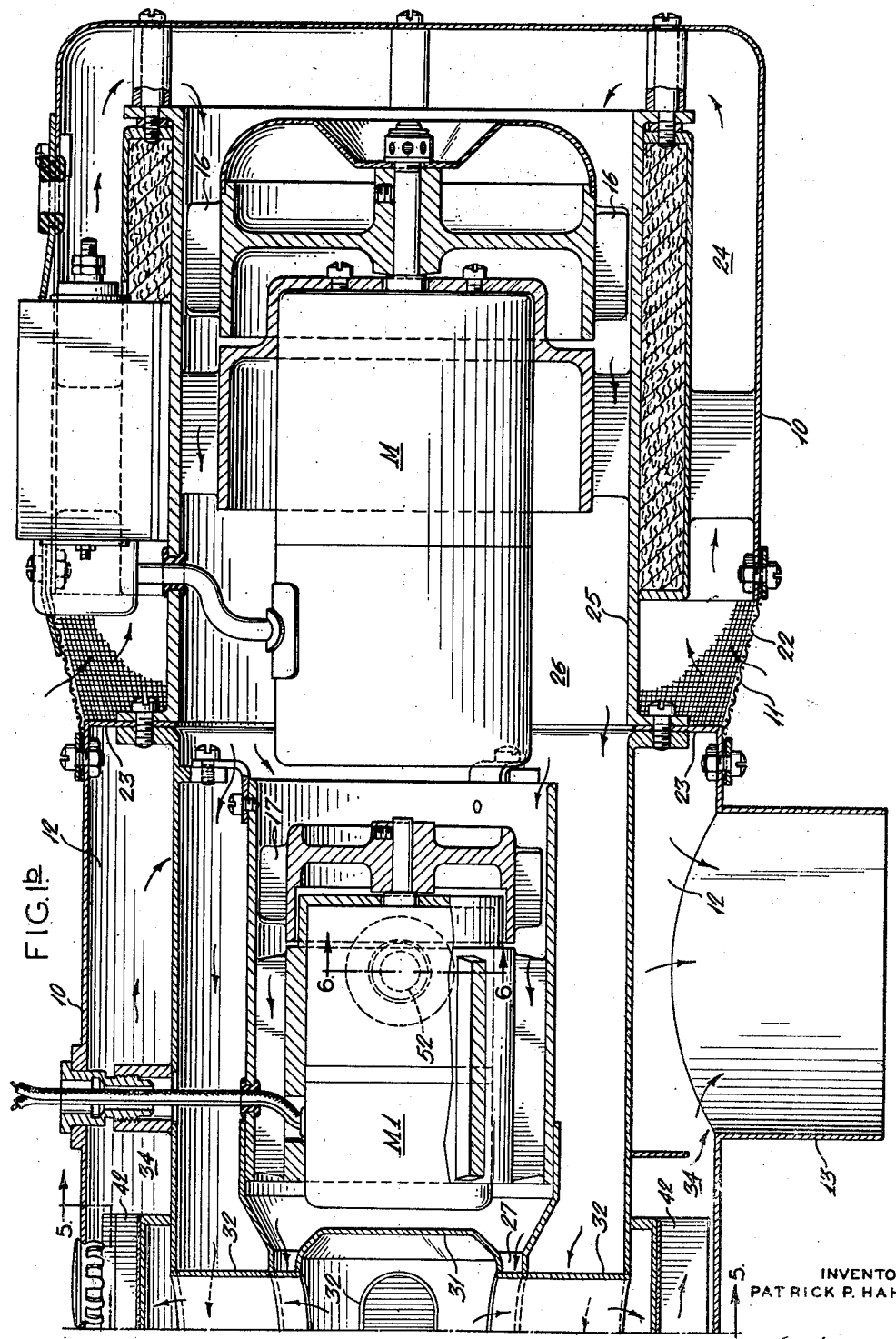

June 15, 1965

P. P. HAHN 3,189,017

FUEL BURNING AIR HEATING APPARATUS

Filed Feb. 28, 1962

INVENTOR:
PATRICK P. HAHN
BY
Howson & Howson
ATTYS.

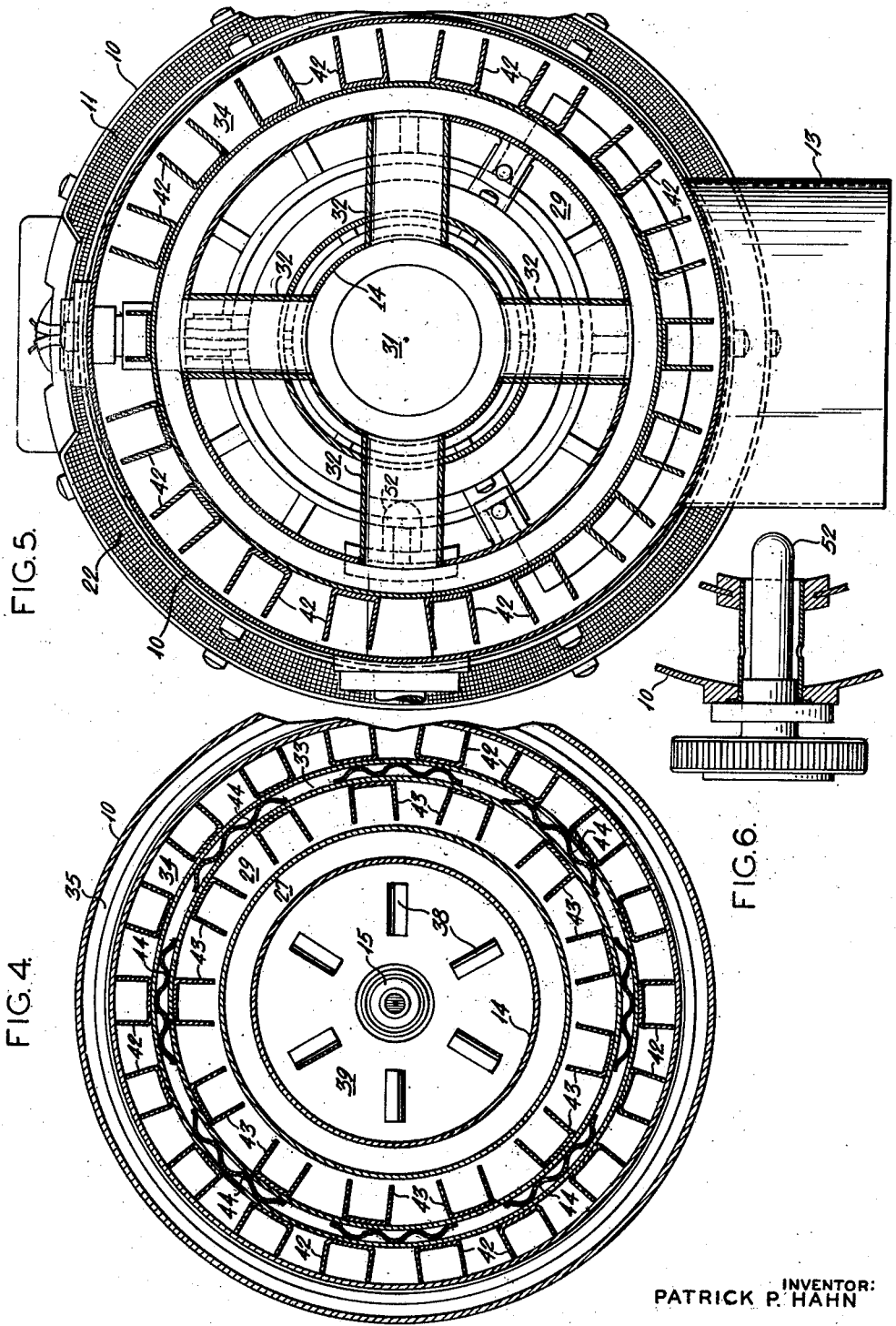

3,189,017
FUEL BURNING AIR HEATING APPARATUS
Patrick P. Hahn, Trooper, Pa., assignor to Thermal Research & Engineering Corporation, Conshohocken, Pa., a corporation of Delaware
Filed Feb. 28, 1962, Ser. No. 176,361
2 Claims. (Cl. 126—116)

This invention relates to burner air heating apparatus and has for an object the provision of a very compact small size heater of high efficiency.

One of the particular objects of the invention is to provide improved air supply, circulating and heating means.

Another object is to provide improved combustion and air heating means.

Another object is to provide means for reducing the deposit of carbon on the walls of the combustion chamber.

The above and other objects as well as various features of novelty and advantages will be apparent from the following description of an exemplary embodiment of the invention, reference being made to the accompanying drawings thereof wherein:

FIG. 1, comprising the parts 1a and 1b, is a vertical axial longitudinal section through the heater;

FIG. 4 is a transverse vertical section taken on the line 4—4 of FIG. 1;

FIG. 5 is a transverse vertical section taken on the line 5—5 of FIG. 1; and

FIG. 6 is a partial transverse vertical section taken on the line 6—6 of FIG. 1.

Figure 1A:
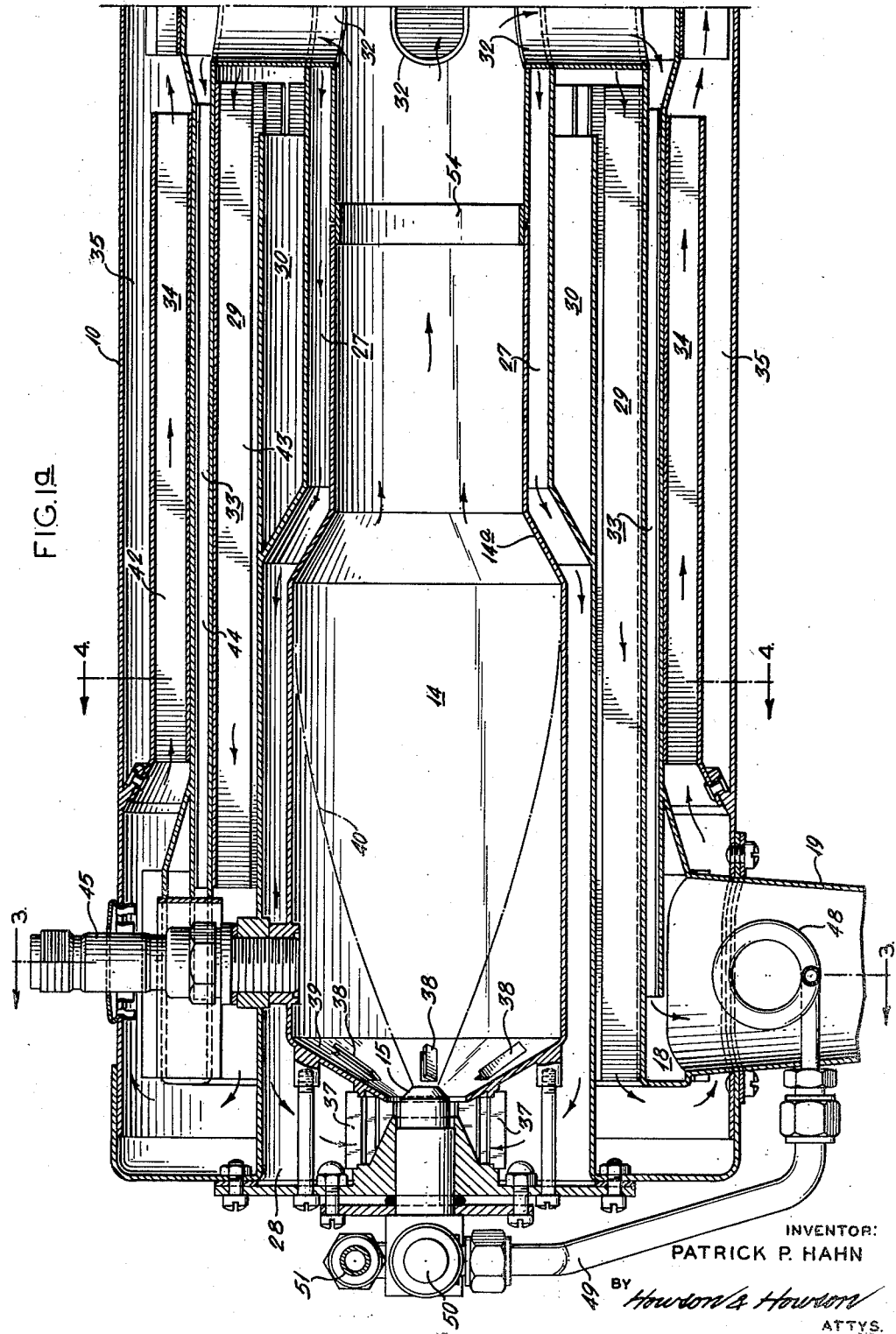

The apparatus comprises an elongated outer casing or shell 10 provided with an annular intake chamber 11 near its right end, an annular heated air outlet chamber 12 having one or more air duct connections 13 at the left of the air intake chamber, a fuel combustion chamber 14, a fuel burner nozzle 15 at the left end of the combustion chamber, a main air blower fan 16 driven by a motor M at the right end of the casing, a combustion air fan 17 or supercharger driven by a motor M1 at the left of the main air fan, an annular outlet chamber 18 for combustion gases having one or more exhaust pipes 19 near the left end of the casing and various details which will be noted as the description proceeds.

The main air intake chamber 11 is provided with a screen 22 and can be provided with an air filter if desired. An annular transverse partition wall 23 separates the air intake chamber 11 from the heated air outlet chamber 12, the intake air passing to the right through an annular chamber or duct 24 between the outer shell and an annular inner partition casing or shell 25 surrounding the fan and motor to leave an annular space or duct 26 therearound for air blown in by the fan.

The intake air from the fan 16 and air supply space 26 divides in the zone of the heated air outlet chamber 12, part of it being drawn in by the combustion air fan 17 and forced through an annular combustion air heating chamber or duct 27 surrounding the combustion chamber to a fuel burner air supply chamber 28 and part of it being forced through an annular inner heating air chamber or duct 29 surrounding the annular combustion air chamber 27. For a reason to be discussed later an annular dead air chamber 30 is provided at an intermediate portion of the length of chambers 27 and 29.

The combustion chamber 14 terminates at an end wall 31 near motor M1 at the heated air outlet zone and the hot combustion gases return through a plurality of radial tubes 32 and an annular combustion gas chamber or duct 33 to the combustion gas outlet chamber 18. The combustion gas chamber 33 surrounds the inner heating air chamber 29.

At the left end of the inner heating air chamber 29 the heating air passes outward through suitable channels and returns to the right through an outer annular heating air chamber or duct 34 surrounding the combustion gas chamber or duct 33. Intermediate its length the outer air duct 34 is reduced in cross-sectional area from the outer side to cause the air to flow more closely over the outer wall of the combustion air chamber or duct 33. The space between the outer wall of the chamber and the main shell 10 constitutes a dead air space 35 which incidentally reduces radiation heat losses from the outer shell in the reduced zone.

Figure 3:
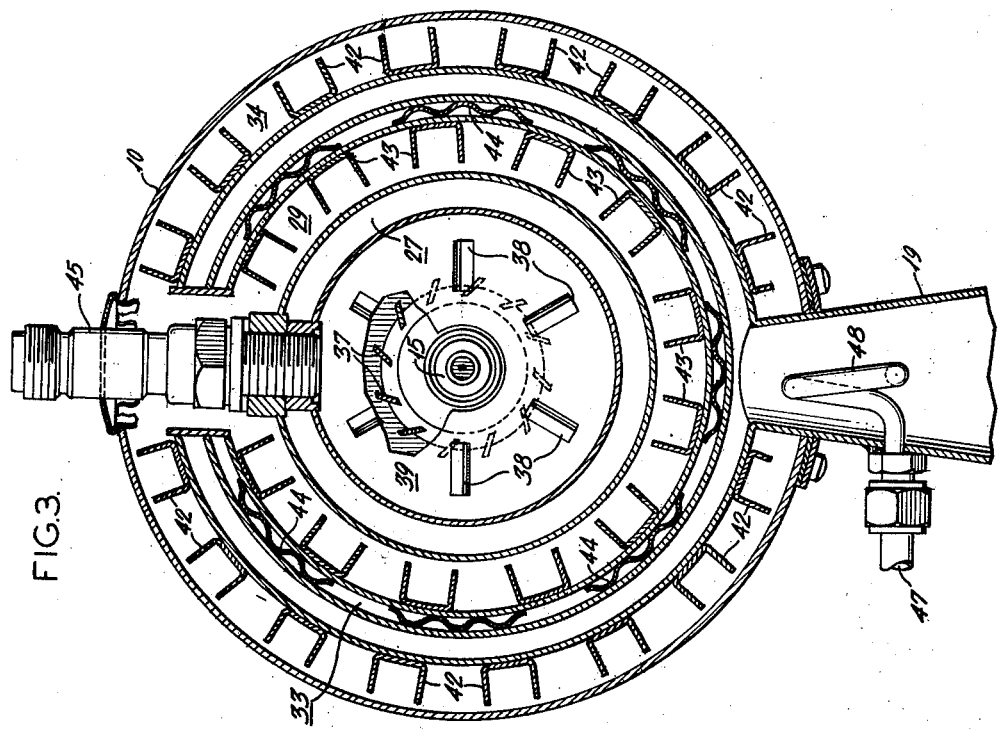
FIG. 3 is a transverse vertical section taken on the line 3—3 of FIG. 1.
Figure 2:
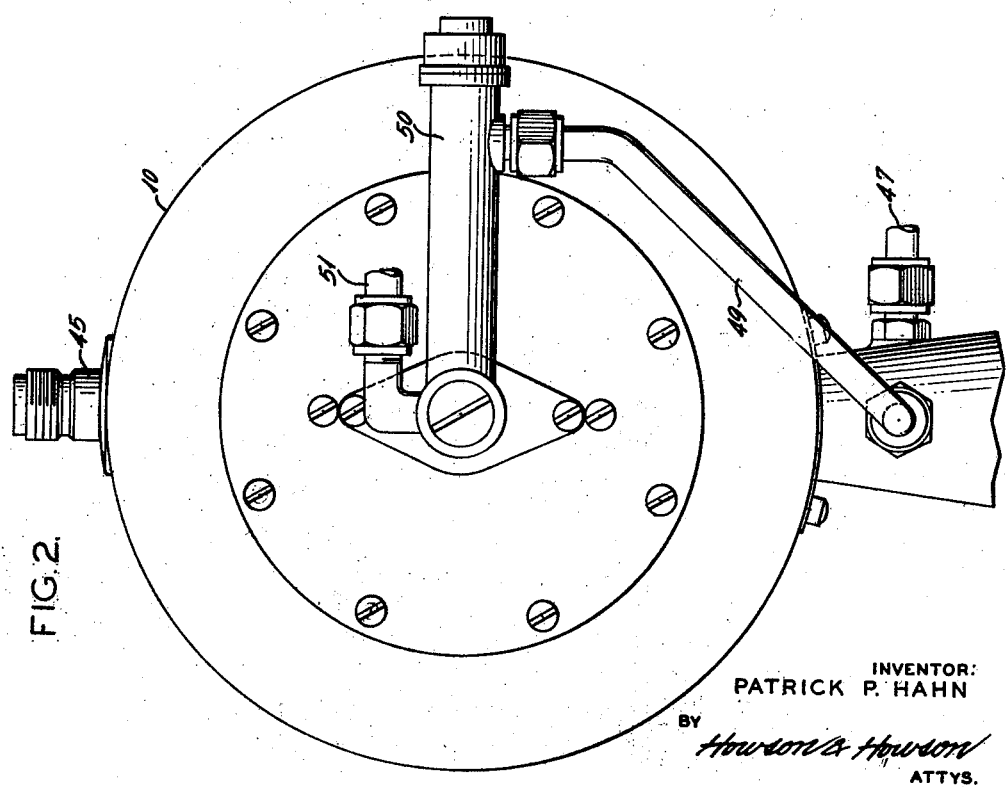
FIG. 2 is a left end elevation.

As shown in FIGS. 1 and 3, vanes 37 are disposed in the air chamber 28 to start the air to swirling as it approaches the combustion chamber and other vanes 38 in the conical forward end plate 39 of the combustion chamber 14 give a further swirling action to the air just as it enters the combustion chamber. The result is that the entire flame or body of burning fuel gases, indicated at 40, is given a strong swirling action to sweep the walls of the combustion chamber.

Dividing vanes 42 in the outer heating air chamber or duct 34, similar divider vanes 43 in the inner heating air chamber or duct 29, and transversely sinuous longitudinally extending sheets 44 in the combustion gas chamber or duct 33, aid in causing the gases to flow evenly and promote heat exchange between wall and gases.

A spark plug 45 provides ignition of fuel.

A fuel supply line 47 leads to a heating coil 48 in the exhaust pipe 19 thence by a pipe 49 to a starting preheater 50 (preferably electrical) and from the starting preheater to the burner. A pipe 51 is provided for supplying atomizing air with the fuel.

FIG. 6 shows a thermostat 52 for controlling the heat of delivered hot air.

It has been found that when a straight or uniform diameter combustion tube 14 is used there is an accumulation of carbon on the wall at the point where the flame strikes the wall, this accumulation continuing until there is a very considerable loss of efficiency. In order to overcome this trouble the present invention provides a reduced section 14a at the point of flame contact and for a distance therebeyond which causes an acceleration of gases along the wall which is sufficient to sweep away the carbon and keep the walls clean.

An expansion ring 54 is provided for the combustion chamber tube beyond the reduced zone 14a.

The purpose of the dead air space 30 will now be apparent. The combustion air chamber or duct 27 is kept of small section to follow the reduced part of the combustion chamber to obtain better heat transfer and the dead air space is left where the outer wall of the combustion air chamber is reduced in diameter, the inner heating air space being kept of uniform size here.

The operation of the apparatus will be apparent from the foregoing description. The combustion air is brought in with a swirling action due to the effect on it of the two sets of directional vanes, the swirling motion continuing in the flame to sweep the walls of the combustion chamber for good heat exchange and to keep the wall free of carbon. The reduced zone in the combustion chamber further insures that the swirling flame will maintain sufficient velocity in the critical zone of contact to avoid accumulation of carbon on the combustion walls.

There is a good heat exchange between the different internested chambers or ducts as proved by the demonstrated high efficiency of the unit in action.

It is thus seen that the invention provides an improved burner heated air heating apparatus which is simple, efficient and economical.

I claim:

1. Burner heating apparatus comprising in combination, means forming a tubular combustion chamber having a larger upstream portion and a smaller downstream portion, fuel burner means in one end of said combustion chamber adapted to produce an outwardly flaring flame which strikes the wall of the combustion chamber at a circumferential region where the larger upstream portion of the combustion chamber merges with the smaller downstream portion thereof, means forming an annular combustion air intake duct of approximately uniform radial width surrounding said combustion chamber in heat exchange relationship with the outer surface of the combustion chamber for substantially the entire length of said combustion chamber, means forming an air heating duct surrounding said combustion air intake duct, said air heating duct closely surrounding and being in heat exchange relationship with the combustion air intake duct along the larger portion of said combustion chamber, and means forming a dead air space around the portion of the combustion air intake duct surrounding the smaller portion of said combustion chamber and inward of said air heating duct.

2. Burner heating apparatus as set forth in claim 1 in which the air heating duct is of approximately uniform radial width and diameter throughout and including means forming an annular return duct for said combustion gases surrounding said air heating duct and in heat exchange relationship therewith, means forming an outlet for said return duct for combustion gases, a fuel pre-heater in said outlet and means forming an annular air heating return duct surrounding and in heat exchange relationship with said return duct for combustion gases.

References Cited by the Examiner

UNITED STATES PATENTS

| | | | |
|---|---|---|---|
| 1,235,855 | 8/17 | Stillman | 158—1.5 |
| 1,923,330 | 8/33 | Sallee | 158—4 |
| 2,007,230 | 7/35 | Wade | 158—36 |
| 2,414,459 | 1/47 | Fletcher | 158—1.5 |
| 2,499,207 | 2/50 | Wolfersberger | 158—4 |
| 2,544,419 | 3/51 | Goddard | 158—4 |
| 2,752,912 | 7/56 | MacCracken | 126—110 |
| 2,757,662 | 8/56 | Baier et al. | 126—110 |
| 2,985,438 | 5/61 | Prowler | 265—19 |

FOREIGN PATENTS

| | | |
|---|---|---|
| 842,503 | 7/60 | Great Britain. |

JAMES W. WESTHAVER, *Primary Examiner.*